July 24, 1962 R. E. MELLENCAMP 3,045,971
ROTARY DISPLAY DEVICE
Filed Sept. 12, 1957 2 Sheets-Sheet 1
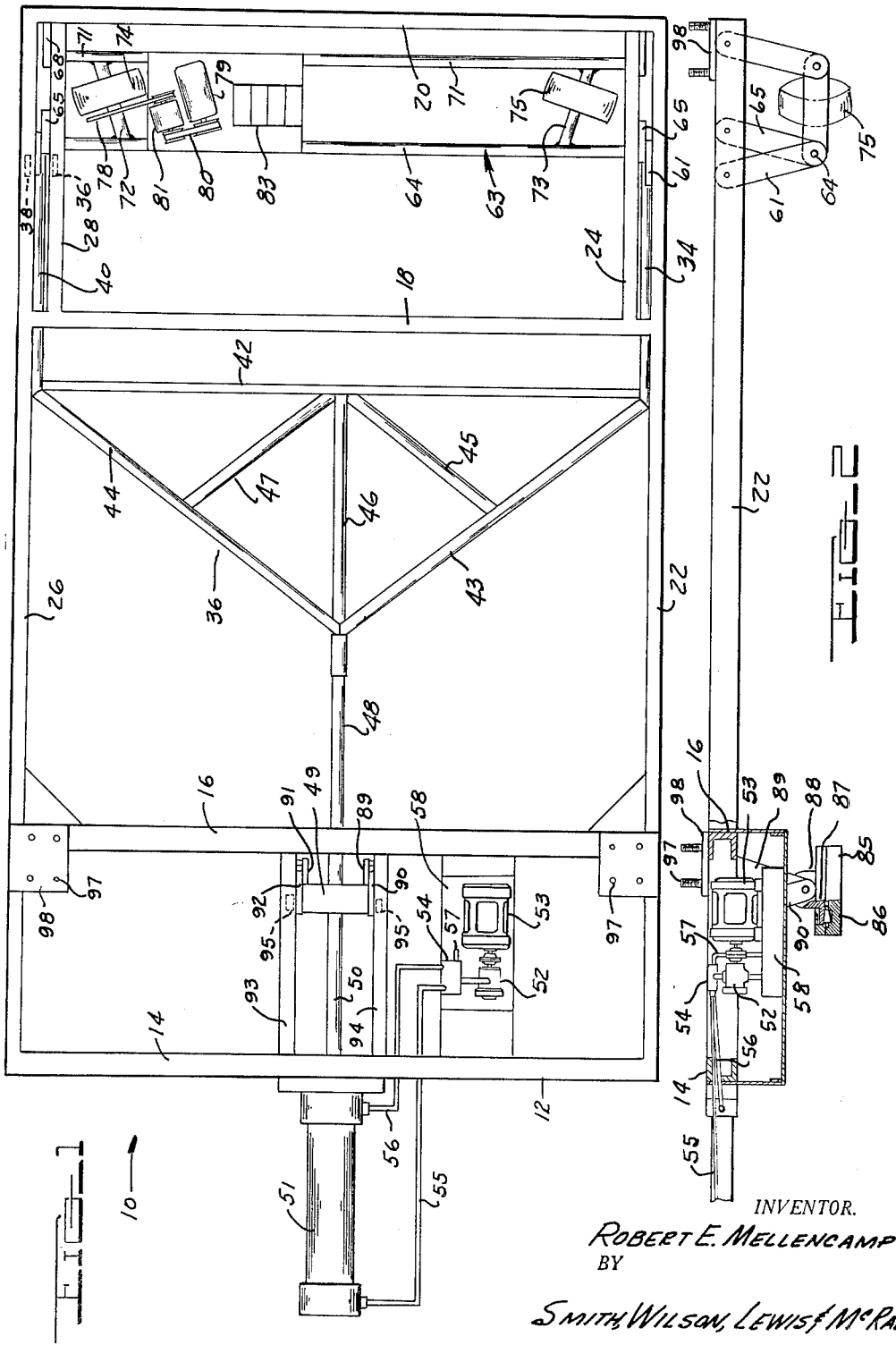
INVENTOR.
ROBERT E. MELLENCAMP
BY
SMITH, WILSON, LEWIS & McRAE July 24, 1962  R. E. MELLENCAMP  3,045,971
ROTARY DISPLAY DEVICE
Filed Sept. 12, 1957  2 Sheets-Sheet 2

INVENTOR.
ROBERT E. MELLENCAMP
BY
SMITH, WILSON, LEWIS & McRAE

3,045,971
ROTARY DISPLAY DEVICE

Robert E. Mellencamp, South Lyon, Mich., assignor to General Motors Corporation, Detroit, Mich., a corporation of Delaware
Filed Sept. 12, 1957, Ser. No. 683,505
7 Claims. (Cl. 254—87)

This invention relates to a mobile display device particularly useful for movably displaying automobiles in automobile showrooms and outdoor display areas.

Objects of the invention are to provide a mobile display device wherein:

(1) The device is of a minimum vertical dimension so as to permit of its being suspended in a concealed non-use position beneath an automobile frame, whereby to permit the automobile to be driven in normal fashion to a display area, after which the display device can be lowered to the ground so as to raise the automobile wheels a slight distance from the ground for rotary display of the automobile.

(2) The display device is provided with self contained power means for raising the automobile and rotating it in the displayed position, thereby enabling the device to be easily shipped from site to site, and allowing movable display of the automobile without the detracting appearance of exterior power mechanisms.

(3) The display device is of adequate strength but fairly low weight.

(4) The device is provided with a "raising-lowering" power means which is fairly fast in its action.

Other objects of this invention will appear in the following description and appended claims, reference being had to the accompanying drawings forming a part of this specification wherein like reference characters designate corresponding parts in the several views.

In the darwings:

FIG. 1 is a top plan view of one embodiment of the invention.

FIG. 2 is a side elevational view of the FIG. 1 embodiment.

Figure 3:
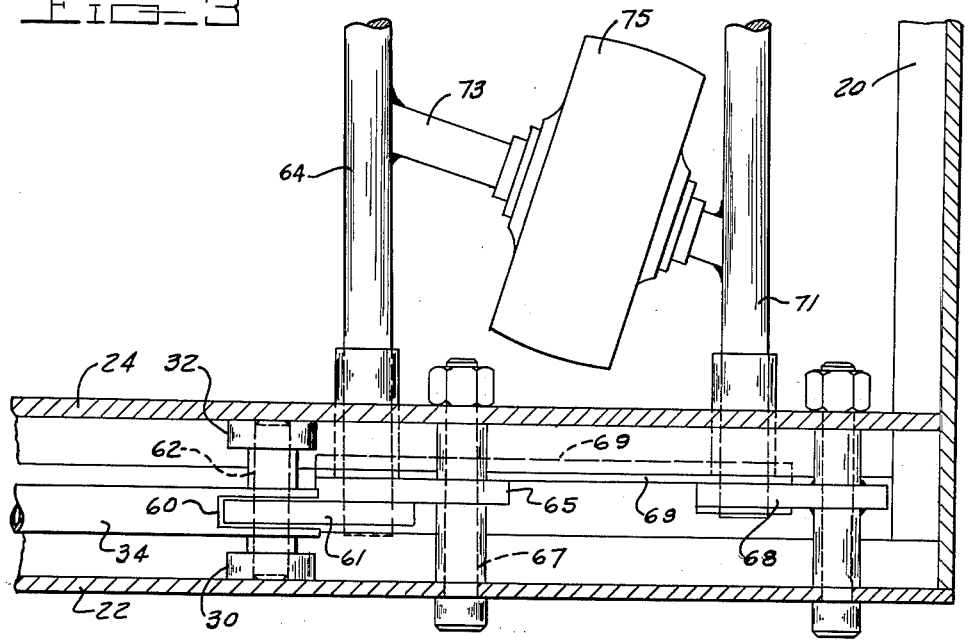
FIG. 3 is an enlarged plan view of a portion of the FIG. 1 embodiment.
Figure 4:
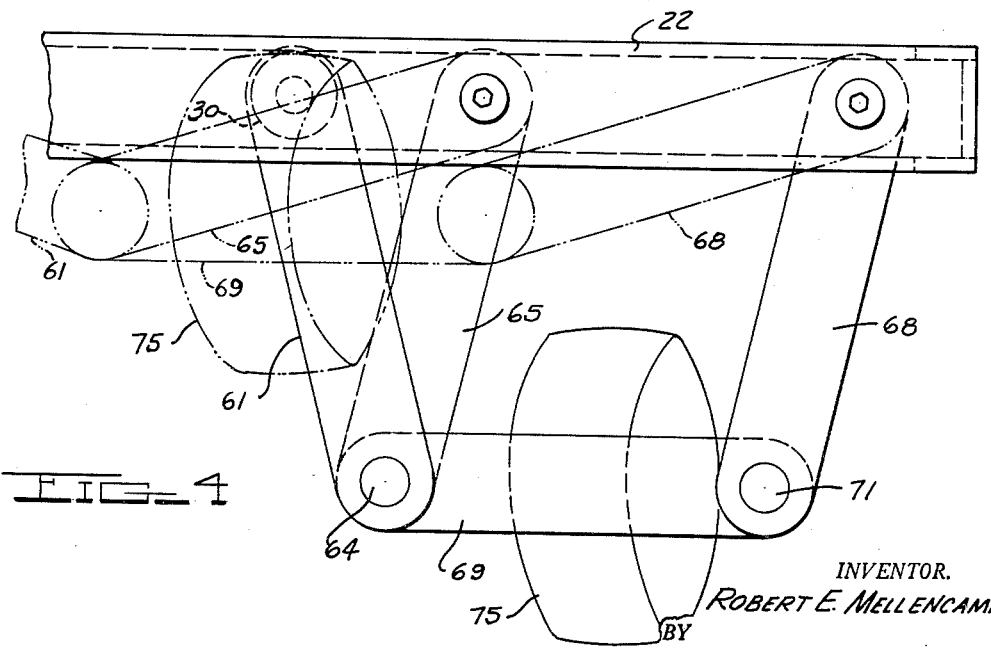
FIG. 4 is an enlarged elevational view of the structure shown in FIG. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a mobile display device 10 which includes a carriage 12 formed by channel members 14, 16, 18, 20, 22, 24, 26 and 28. Members 22 and 24 face one another so as to form trackways for receiving rollers 30 and 32 carried by tubular arm 34 of slide structure 36. In similar manner members 26 and 28 face one another so as to form trackways for receiving rollers 36 and 38 carried by tubular arm 40 of slide structure 36.

Slide structure 36 includes a tubular member 42 interconnecting arms 34 and 40, as well as two converging arms 43 and 44, and three brace arms 45, 46 and 47. A tubular thrust arm 48 extends from arms 43 and 44 to a cross head 49, which is connected to the piston rod 50 of hydraulic cylinder 51.

Cylinder 51 is powered by a pump 52 which is driven by an electric motor 53. Pump 52 connects with a four way valve 54 which communicates with two feed lines 55 and 56 and a drain line 57 leading to reservoir 58.

The arrangement is such that when pressure fluid is fed through line 56 piston rod 50 is drawn into the cylinder so as to move slide structure 36 to the left from its illustrated position.

The right end portion of arms 34 and 40 are bifurcated at 60 to accommodate the ends of links 61. Pins 62 extend through the bifurcated portions to pivotally mount the links and rollably mount the two sets of rollers 30, 32, 36 and 38.

The opposite ends of links 61 are pivotally connected to an elongated rod 64. Another set of links 65 is pivotally connected to rod 64 and extends upwardly therefrom to a point between the adjacent channel members 22, 24, 26 and 28. A pin 67 extends through the channel members and the upper end of each link 65 so as to mount the links for pivotal movement relative to carriage 12.

Elongated rod 64 cooperates with end plates 69 and elongated rod 71 to form an elevator structure 63, on which are fixedly carried two axles 72 and 73 for ground-engaging rollers 74 and 75. A second set of links 68 extends parallel to links 65 so as to mount the elevator structure for raisable and lowerable movements. The link arrangement is such that when cylinder 51 is actuated to move slide structure 34 to the left (in FIG. 2) links 61 are drawn toward a horizontal position so as to carry elevator structure 63 upwardly in accordance with the movement of supporting links 65 and 68.

The axle 72 for roller 74 carries a sprocket, around which is trained a chain 78 driven by reversible electric motor 79 through a V-belt 80 and speed reduction unit 81. Batteries 83 provide the energy for motor 79 and motor 53.

When an automobile is being movably displayed on carriage 12 motor 79 drives roller 74 to give the carriage its movement. The weight of the automobile causes the development of considerable momentum, and when current is cut off to motor 79 (by a switch structure in the automobile) considerable stress is put on the drive pins in speed reduction unit 81. A clutch (not shown) may be positioned between motor 79 and unit 81 to relieve this stress.

During the display operation the automobile is given a three point support by roller 74, roller 75 and foot structure 85. Foot structure 85 includes a flat-bottomed foot member 86 swivelly mounted on a bearing plate 87. A series of conical rollers are positioned between the lower face of plate 87 and the adjacent face of member 86 to permit rotary movement between members 86 and 87.

Plate 87 is provided with two ears 88 which are pivotally connected to links 89, 90, 91 and 92. Links 89 and 91 extend upwardly to pivotal connections with channel members 93 and 94, which fixedly extend between members 14 and 16. Links 90 and 92 extend upwardly from ears 88 to pivotal connections with cross head 49. The cross head is provided with rollers 95 for its slidable support between channels 93 and 94, it being appreciated that movement of head 49 to the left is effective to draw links 90 and 92 toward horizontal positions wherein foot member 86 is drawn upwardly toward carriage 12.

The illustrated display device may be fixedly secured to the automobile or removable therefrom. When the "removable" construction is employed in a display operation, the device is initially positioned with its piston rod 50 in a leftward position, such that rollers 74, 75 and foot member 86 are closely adjacent the underside of carriage 12. Elements 74, 75 and 86 at this time rest on the ground so that carriage 12 is put in a lowered position. The automobile is then driven over the display device until its rear axle is located above rollers 74 and 75; in this position foot member 86 is located approximately in the vertical center line of the automobile.

As the next step in the display operation motor 53 is actuated to pump pressure fluid through line 55 so as to move piston rod 50 toward the FIG. 2 position. The net effect of this movement is to raise carriage 12 away from elements 74, 75 and 86 into a position supporting the automobile with its tires spaced an inch or so above the ground.

Motor 79 may then be energized to drive the carriage in an arcuate path around the vertical axis defined by foot member 86. In this connection it will be noted from FIG. 1 that axles 72 and 73 are located on lines converging toward member 86 so as to permit the arcuate movement. During the arcuate movement member 86 remains in fixed position on the ground, and bearing plate 87 rotates around its central axis.

At the conclusion of the display operation motor 53 may be energized to pump pressure fluid through line 56 so as to force piston rod 50 to the left (in FIG. 1), whereby to lower carriage 12 and permit the automobile to be driven away from the display device in the conventional manner.

As previously indicated the display device may be fixedly secured to the automobile understructure. In this "fixed" arrangement studs 97 may fixedly project from carriage-mounted plates 98 so as to cooperate with clamping plates and nuts (not shown) in a manner to suspend the display device from the automobile understructure. The vertical dimension of the display device is comparatively small when the piston rod is in its leftward position (preferably something in the neighborhood of five inches); consequently the display device can be suspended beneath the automobile without interfering with normal automobile operation. Thus, the automobile can be driven to a predetermined point in an arena or exhibition ground, after which motor 53 can be actuated to lower elements 74, 75 and 86 in a manner to transfer the automobile weight onto carriage 12. Motor 79 may then be energized to rotate the automobile around the vertical axis of member 86.

I claim:

1. An automobile display device comprising a carriage positionable beneath the understructure of an automobile; a ground-engageable foot structure carried beneath the carriage; a slide structure mounted on the carriage for horizontal movement therealong; a first link having its opposite ends pivotally connected to the carriage and foot structure, respectively; a second link having its opposite ends pivotally connected to the slide structure and foot structure, respectively; two horizontally spaced, vertical rollers remote from the foot structure but having their axles located on lines converging toward said foot structure; elevator structure supporting said rollers beneath the carriage; third and fourth links having their opposite ends pivotally connected to the carriage and elevator structure, respectively; fifth and sixth links having their opposite ends pivotally connected to the slide structure and elevator structure, respectively; power means on said carriage for driving the slide structure horizontally along the carriage so as to move the links toward vertical positions in a manner to lower the foot structure and rollers relative to the carriage; and second power means on the display device for driving one of the rollers around its axle when the rollers and foot structure are lowered so as to effect a rotary movement of the carriage around the vertical axis defined by the foot structure.

2. The combination of claim 1 wherein the carriage includes two spaced channel members forming horizontal guide ways; said slide structure including a cross head connected with the second link and two parallel arms extending along the channel members, with anti-friction guide elements extending from each of said arms into the adjacent channels for supporting and guiding the slide structure; said first power means comprising a fluid cylinder mounted on the carriage and a piston rod extending from the cylinder to the cross head.

3. A display device comprising a carriage releasably clampable against the understructure of an automotive vehicle to be carried thereby during normal driving operations; a lowerable foot structure suspended from the carriage; lowerable rotary ground-engaging means suspended from the carriage at a point remote from the foot structure for driving the carriage around the axis defined by the foot structure; self-contained power means carried by the carriage for raising and lowering the foot structure and ground-engaging means; and a second power means carried on the display device in driving engagement with the rotary ground-engaging means.

4. The combination comprising a carriage; a ground engageable foot structure carried beneath said carriage; means suspending said foot structure from the carriage for raisable and lowerable movements relative thereto; rotary ground-engaging means for rotating the carriage around the axis defined by the foot structure; means suspending said rotary ground-engaging means from the carriage for raisable and lowerable movements relative thereto; and reciprocable power means operative on both of the suspending means to raise the carriage on one stroke and to lower the carriage on the return stroke; said rotary ground-engaging means comprising two rotary elements spaced substantial distances from each other and from the foot structure, whereby to define a three point support for the carriage; the second mentioned suspending means comprising a horizontally movable frame structure guidably carried on the carriage, an elevator means carrying the two spaced rotary elements thereon, and link means interconnected between the carriage, elevator means; and frame structure for translating horizontal movement of the frame structure into vertical movement of the elevator means.

5. The combination comprising a carriage; a ground-engageable foot structure carried beneath said carriage; means suspending said foot structure from the carriage for raisable and lowerable movements relative thereto; rotary ground-engaging means for rotating the carriage around the axis defined by the foot structure; means suspending said rotary ground-engaging means from the carriage for raisable and lowerable movements relative thereto; and reciprocable power means operative on both of the suspending means to raise the carriage on one stroke and to lower the carriage on the return stroke; said second mentioned suspending means comprising an elevator structure; the combination further comprising motor means positioned on said elevator structure in operative driving engagement with the rotary ground-engaging means.

6. The combination comprising a carriage; a ground-engageable foot structure carried beneath said carriage; means suspending said foot structure from the carriage for raisable and lowerable movements relative thereto; rotary ground-engaging means for rotating the carriage around the axis defined by the foot structure; means suspending said rotary ground-engaging means from the carriage for raisable and lowerable movements relative thereto; and reciprocable power means operative on both of the suspending means to raise the carriage on one stroke and to lower the carriage on the return stroke; said first mentioned suspending means comprising two links, one of which depends from the carriage to connect with the foot structure, and the other of which depends from the power means to connect with the foot structure, whereby during reciprocal movement of the power means the upper ends of the two links are moved toward and away from one another so as to move the links between substantially vertical positions wherein the carriage is raised and substantially horizontal positions wherein the carriage is lowered.

7. The combination comprising a carriage; a ground-engageable foot structure carried beneath said carriage; means suspending said foot structure from the carriage for raisable and lowerable movements relative thereto; rotary ground-engaging means for rotating the carriage around the axis defined by the foot structure; means suspending said rotary ground-engaging means from the carriage for raisable and lowerable movements relative thereto; and reciprocable power means operative on both of the suspending means to raise the carriage on one stroke and to lower the carriage on the return stroke; said power means comprising a horizontally extending fluid piston-cylinder assembly located with one part thereof engaging both suspending means and with the other part engaging the carriage.

References Cited in the file of this patent

UNITED STATES PATENTS

| | | |
|---|---|---|
| 982,418 | Ferris | Jan. 24, 1911 |
| 1,953,442 | Sorescu et al. | Apr. 3, 1934 |

FOREIGN PATENTS

| | | |
|---|---|---|
| 92,868 | Switzerland | Mar. 16, 1922 |